(12) United States Patent
Han et al.

(10) Patent No.: US 12,321,195 B2
(45) Date of Patent: Jun. 3, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Linhong Han, Beijing (CN); Shikai Qin, Beijing (CN); Tingliang Liu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 566 days.

(21) Appl. No.: 17/311,698

(22) PCT Filed: Nov. 19, 2020

(86) PCT No.: PCT/CN2020/129927
§ 371 (c)(1),
(2) Date: Jun. 8, 2021

(87) PCT Pub. No.: WO2021/104135
PCT Pub. Date: Jun. 3, 2021

(65) Prior Publication Data
US 2022/0026955 A1    Jan. 27, 2022

(30) Foreign Application Priority Data
Nov. 29, 2019   (CN) .......................... 201911200512.1

(51) Int. Cl.
*G06F 1/16*    (2006.01)

(52) U.S. Cl.
CPC .......... *G06F 1/1652* (2013.01); *G06F 1/1656* (2013.01)

(58) Field of Classification Search
CPC ...... G06F 1/1652; G06F 1/1656; G09F 9/301; H05K 1/028; H05K 1/0298; H05K 1/147; H05K 1/148; H01L 51/0097
See application file for complete search history.

(56) References Cited

U.S. PATENT DOCUMENTS 11,599,152 B2 *   3/2023   Sim .......................... G06F 1/165
2017/0365650 A1 * 12/2017  Kwon ................... H10K 59/131
(Continued)

FOREIGN PATENT DOCUMENTS

CN         206559729 U    10/2017
CN         107527997 A    12/2017
(Continued)

OTHER PUBLICATIONS

Office Action dated Jan. 26, 2021 for Chinese Patent Application No. 201911200512.1 and English Translation.
(Continued)

*Primary Examiner* — James Wu
*Assistant Examiner* — Christopher L Augustin
(74) *Attorney, Agent, or Firm* — Ling Wu; Stephen Yang; Ling and Yang Intellectual Property

(57) ABSTRACT

A display panel and a display device. The display panel comprises a display substrate; the display substrate comprises a display area and a flexible bending portion protruding from the display area; the flexible bending portion comprises a bending area close to the display area; the flexible bending portion is hidden on the side of the display substrate facing away from the display side after being bent by the bending area; the display panel is a bendable panel in a first direction; the display panel has a bendable section and a non-bendable section in the first direction; in the first direction, the bending area is located within a range defined by the non-bendable section, and the first direction is a (Continued)

direction perpendicular to the direction in which the flexible bending portion protrudes with respect to the display area.

15 Claims, 4 Drawing Sheets

(56) References Cited

U.S. PATENT DOCUMENTS

| | | | |
|---|---|---|---|
| 2018/0011514 A1* | 1/2018 | Yoo | G06F 1/1658 |
| 2018/0068919 A1* | 3/2018 | Chung | G09G 3/3685 |
| 2018/0284935 A1* | 10/2018 | Lee | G06F 1/1656 |
| 2019/0173030 A1 | 6/2019 | Kim et al. | |
| 2019/0206968 A1* | 7/2019 | Yang | H10K 59/131 |
| 2019/0228698 A1 | 7/2019 | Hu et al. | |
| 2019/0245025 A1* | 8/2019 | Li | H10K 59/131 |
| 2019/0289712 A1 | 9/2019 | Huang | |
| 2020/0042125 A1* | 2/2020 | Lee | G06F 1/1637 |
| 2020/0146147 A1* | 5/2020 | Zhang | H05K 1/189 |
| 2020/0176696 A1* | 6/2020 | Dai | H10K 59/131 |
| 2020/0192433 A1* | 6/2020 | Shin | G06F 1/206 |
| 2020/0341516 A1 | 10/2020 | Huang et al. | |

FOREIGN PATENT DOCUMENTS

| | | |
|---|---|---|
| CN | 107799015 A | 3/2018 |
| CN | 108230931 A | 6/2018 |
| CN | 108231800 A | 6/2018 |
| CN | 108241457 A | 7/2018 |
| CN | 109087586 A | 12/2018 |
| CN | 109166839 A | 1/2019 |
| CN | 109377883 A | 2/2019 |
| CN | 110211493 A | 9/2019 |
| CN | 110225160 A | 9/2019 |
| CN | 110277015 A | 9/2019 |
| CN | 110853521 A | 2/2020 |

OTHER PUBLICATIONS

Office Action dated Aug. 11, 2021 for Chinese Patent Application No. 201911200512.1 and English Translation.
International Search Report for PCT/CN2020/129927 Mailed Feb. 19, 2021.

* cited by examiner

DISPLAY PANEL AND DISPLAY DEVICE

CROSS-REFERENCE TO RELATED APPLICATIONS

The present application is a U.S. National Phase Entry of International Application No. PCT/CN2020/129927 having an international filing date of Nov. 19, 2020, which claims priority to Chinese Patent Application No. 201911200512.1 entitled "Display Panel and Display Device" and filed to the CNIPA on Nov. 29, 2019. The above-identified applications are incorporated into this application by reference in their entirety.

TECHNICAL FIELD

The present disclosure relates to, but is not limited to, the field of display technology, and more particularly, to a display panel and a display device.

BACKGROUND

Compared with a display panel using glass as a substrate, a flexible display panel usually uses an organic film layer such as a polyimide (PI) film layer as a substrate to implement four-side bending of the flexible display panel. In order to implement a narrow frame of the display panel, the flexible display panel has a flexible bending portion protruding from a display area. The flexible bending portion is bent and hidden in a side of the display panel away from a display side.

When the flexible display panel is bent in use, the flexible bending portion is affected not only by its own bending, but also by bending of the display panel, resulting in an increased force acting on the flexible bending portion, such that the flexible bending portion prone to cracking, thereby affecting normal display of the display panel.

SUMMARY

A summary of the subject matter described in detail in the present disclosure will be provided below. The summary is not intended to limit the protection scope of the claims.

The present disclosure provides a display panel including a display substrate, wherein the display substrate includes a display area and a flexible bending portion protruding from the display area. The flexible bending portion includes a bending area close to the display area, the flexible bending portion is hidden in one side of the display substrate away from a display side after the bending area is bent, the display panel is a bendable panel in a first direction, the display panel has a bendable section and a non-bendable section in the first direction, and the bending area is located within a range defined by the non-bendable section in the first direction, the first direction is a direction perpendicular to a direction in which the flexible bendable portion protrudes relative to the display area.

In an exemplary implementation, the bendable section includes a first bendable section and a second bendable section located respectively on both sides of the display panel in the first direction, and the non-bendable section is located between the first bendable section and the second bendable section.

In an exemplary implementation, a size of the bending area in the first direction is ¼ to ½ of a size of the display panel in the first direction.

In an exemplary v, a size of the non-bendable section in the first direction is equal to a size of the bending area in the first direction.

In an exemplary implementation, the flexible bending portion further includes a bonding area located on one side of the bending area away from the display area, and a size of the bonding area is larger than a size of the bending area in the first direction.

In an exemplary implementation, the flexible bending portion further includes a transition area located between the bending area and the bonding area, and a side edge of the transition area is a straight edge or a curved edge.

In an exemplary implementation, the bonding area is provided with multiple bonding pads for bonding to connect with a control circuit board, and the bending area is provided with multiple connecting lines for connecting the bonding pads to signal lines in the display area.

In an exemplary implementation, the first bendable section and the second bendable section are arranged on both sides of the display panel symmetrically.

In an exemplary implementation, the display panel is a bendable panel in a second direction perpendicular to the first direction.

In an exemplary implementation, the display panel further includes a cover plate arranged on the display side of the display substrate, a circumferential edge of the cover plate protrudes from the display area, and a size of the display panel in the first direction is a size of the cover plate in the first direction.

The present disclosure further provides a display device including any display panel described above.

In an exemplary implementation, the display device may be any one or more of a mobile phone, a tablet computer, a television, a display, a notebook computer, a digital photo frame, or a navigator.

Other features and advantages of the present disclosure will be set forth in the following specification, and will become apparent partially from the specification, or be understood by practice of the present disclosure. Objects and other advantages of the present disclosure may be implemented and obtained by structures specifically pointed out in the specification, claims and drawings.

Other aspects may become apparent upon reading and understanding the accompanying drawings and the detailed description.

BRIEF DESCRIPTION OF DRAWINGS

The accompanying drawings are intended to provide a further understanding of technical schemes of the present disclosure and form a portion of the specification, and are intended to explain the technical schemes of the present disclosure together with embodiments of the present application and not constitute a limitation to the technical schemes of the present disclosure.

DETAILED DESCRIPTION

Embodiments of the present disclosure will be described in detail hereinafter with reference to the accompanying drawings. It should be noted that the embodiments in the present application and the features in the embodiments can be combined with each other arbitrarily without a conflict.

Figure 1:
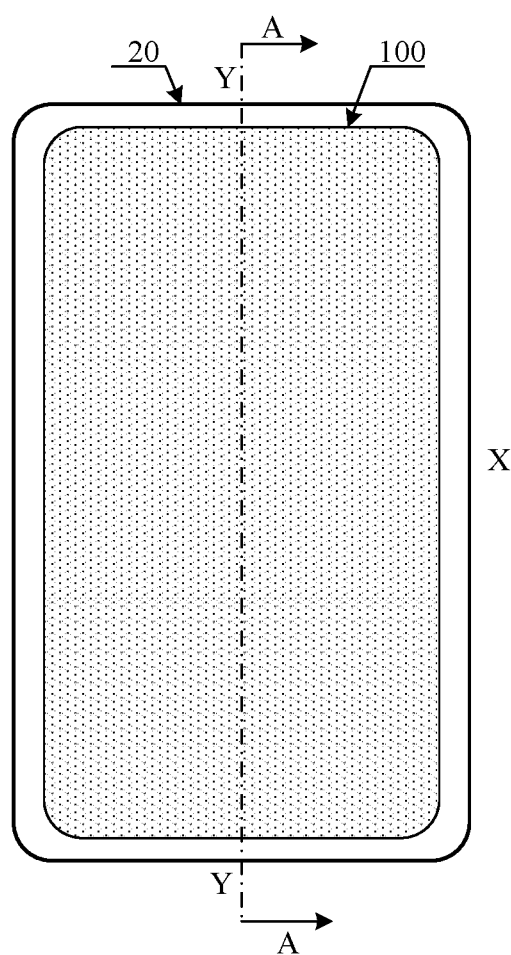
FIG. 1 is a schematic plan view of a flexible display panel.
Figure 2:
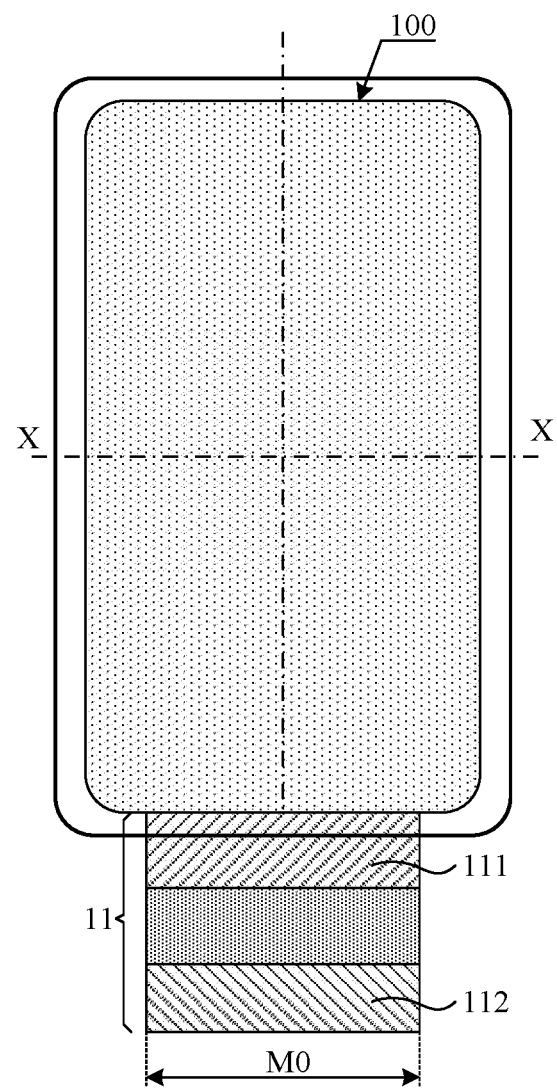
FIG. 2 is a schematic plan view of the flexible display panel shown in FIG. 1 after a flexible bending portion thereof is unfolded.
Figure 3:
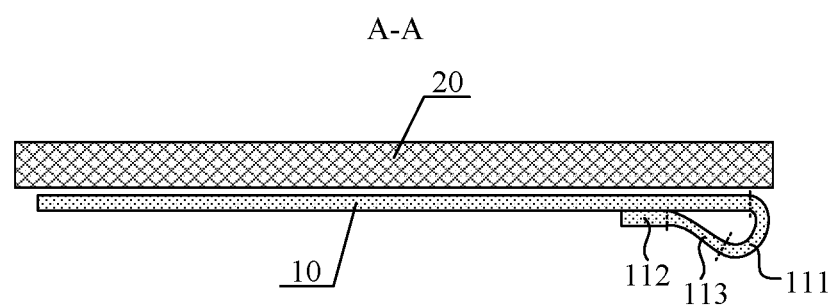
FIG. 3 is a schematic section view along A-A in FIG. 1.

FIG. 1 is a schematic plan view of a flexible display panel, FIG. 2 is a schematic plan view of the flexible display panel shown in FIG. 1 after a flexible bending portion thereof is unfolded, and FIG. 3 is a schematic section view along an A-A in FIG. 1. As shown in FIGS. 1, 2 and 3, the flexible display panel includes a display area 100. On a plane A-A perpendicular to the display panel, the display panel includes a display substrate 10 and a cover plate 20 disposed on a display side of the display substrate 10. The display substrate 10 includes a flexible bending portion 11 protruding from the display area 100. The flexible bending portion 11 includes a bending area 111 close to the display area 100 and a bonding area 112 away from the display area 100. In an exemplary implementation, the bonding area 112 is provided with multiple bonding pads for bonding to connect with a control circuit board, and the bending area 111 is provided with multiple connecting lines for connecting the bonding pads to signal lines in the display area. The flexible bending portion 11 is hidden in a side of the display substrate 10 away from the cover plate 20 through bending the bending area 111, as shown in FIG. 3.

Figure 4:
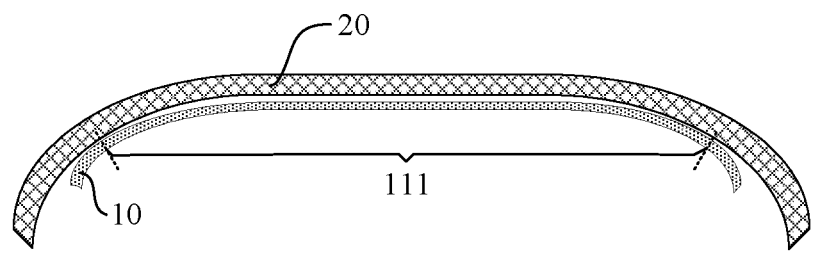
FIG. 4 is a schematic section view of the flexible display panel shown in FIG. 1 after being bent in a first direction X.

The flexible display panel may generally be bent in a first direction X and a second direction Y. FIG. 4 is a schematic section view of the flexible display panel shown in FIG. 1 after being bent in the first direction X. A position of the bending area 111 of the flexible bending portion 11 is shown in FIG. 4. As shown in FIG. 4, after the flexible display panel is bent in the first direction X, the display substrate 10 will be subjected to a bending force along the first direction X, and due to difference in bending performance between the display substrate 10 and the cover plate 20, both sides of the display substrate 10 will also be subjected to a shear stress acted thereon due to bending of the cover plate 20. Therefore, when the display panel is bent as shown in FIG. 4, the bending area of the flexible bending portion 11 will be subjected to both the bending force along the first direction X and the shear stress acted thereon due to bending of the cover plate 20. In addition, the bending area 111 of the flexible bending portion 11 will also be subjected to an internal bending force caused by its own bending (as shown in FIG. 3) at the same time. These three forces act on the bending area 111 at the same time, such that the forces acting on the bending area 111 increase, which is not conducive to dispersion of the forces acting on the bending area 111 and causes that cracks occur easily in the bending area 111, thereby affecting normal display of the display panel.

An embodiment of the present disclosure provides a display panel. The display panel includes a display substrate which includes a display area and a flexible bending portion protruding from the display area. The flexible bending portion includes a bending area close to the display area, and is hidden in one side of the display substrate away from a display side after the bending area is bent. The display panel is a bendable panel in a first direction and has a bendable section and a non-bendable section in the first direction. In the first direction, the bending area is located within a range defined by the non-bendable section. The first direction is a direction perpendicular to a direction in which the flexible bending portion protrudes relative to the display area.

In the embodiment of the present disclosure, when the display panel is bent in the first direction, the non-bendable section will not be bent. The bending area is located within the range defined by the non-bendable section, thus the bending area will not be bent in the first direction, so that the bending area will not be subjected to a bending force along the first direction. In addition, since the bending area is located outside a range of the bendable section, the bending area will not be subjected to a shear stress caused by bending of other film layers (such as a cover plate) of the display panel. Therefore, the bending area is only subjected to an internal bending force caused by its own bending, so that the forces acting on the bending area are decreased greatly, which is conducive to dispersion of the forces acting on the bending area, and avoids cracks of the bending area and ensures normal display of the display panel.

The technical schemes of the present disclosure will be described below through exemplary embodiments.

Figure 5:
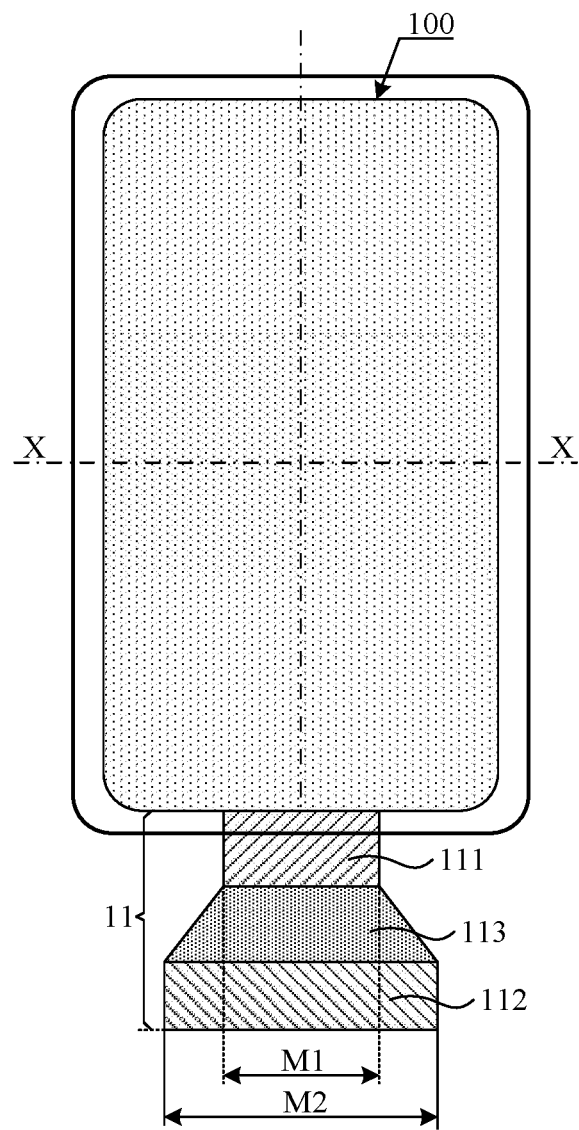
FIG. 5 is a schematic diagram of a structure of an unfolded display panel according to an embodiment of the present disclosure.

FIG. 5 is a schematic diagram of a structure of an unfolded display panel according to an embodiment of the present disclosure. A schematic view of a planar structure of the display panel according to the embodiment of the present disclosure is shown in FIG. 1, and a schematic A-A section view of the display panel is shown in FIG. 3. As shown in FIGS. 1, 3 and 5, the display panel includes a display substrate 10. The display substrate 10 includes a display area 100 and a flexible bending portion 11 protruding from the display area 100. The flexible bending portion 11 includes a bending area 111 close to the display area 100, and the flexible bending portion 11 is hidden in a side of the display substrate 10 away from a cover plate 20 after the bending area 111 is bent.

Figure 6:
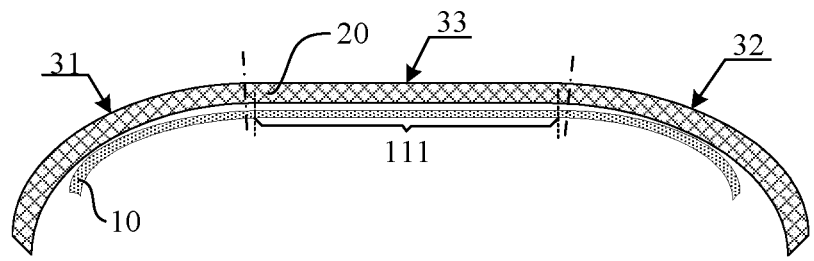
FIG. 6 is a schematic section view of a display panel after being bent in a first direction according to an embodiment of the present disclosure.

FIG. 6 is a schematic section view of a display panel after being bent in a first direction according to an embodiment of the present disclosure. A direction in which a flexible bending portion 11 protrudes relative to a display area 100 is set as a second direction Y, and a first direction X is a direction perpendicular to the second direction Y, as shown in FIG. 1. In the first direction X, the display panel is a bendable panel. In the first direction X, the display panel has a bendable section and a non-bendable section 33. In the first direction, a bending area 111 is located within a range defined by the non-bendable section. FIG. 6 shows a position of the bending area 111, which is located within the range defined by the non-bendable section 33 in the first direction X, that is to say, the bending area 111 may either be located inside the range defined by the non-bendable section 33 in the first direction or coincide with the range defined by the non-bendable section 33 in the first direction.

In the embodiment of the present disclosure, when the display panel is bent in the first direction X, the non-bendable section 33 will not be bent. The bending area 111 is located within the range defined by the non-bendable section 33, thus the bending area 111 will not be bent in the first direction X, so that the bending area 111 will not be subjected to a bending force along the first direction X. Moreover, since the bending area 111 is located outside a range of the bendable section, the bending area 111 will not be subjected to a shear stress caused by bending of other film layers (such as a cover plate) of the display panel, thus the bending area 111 is only subjected to an internal bending force caused by its own bending (as shown in FIG. 3).

Compared with that shown in FIG. 4, in the embodiment of the present disclosure forces acting on the bending area 111 are decreased greatly, which is conducive to dispersion of the forces acting on the bending area 111, and avoids cracks of the bending area 111 and ensures normal display of the display panel.

In this embodiment, as shown in FIG. 6, the bendable section includes a first bendable section 31 and a second bendable section 32 located respectively on both sides of the display panel in the first direction, and the non-bendable section 33 is located between the first bendable section 31 and the second bendable section 32. Such structure meets customers' bending requirements for the display panel. In addition, the non-bendable section 33 is located between the first bendable section 31 and the second bendable section 32, thus the bending area 111 is also located in the middle position of the display panel, which meets a normal preparation structure of the display panel and facilitates production of the display panel.

In other embodiments, the bendable section and the non-bendable section may be arranged arbitrarily in the first direction as long as the bending area of the flexible bending portion is located within the range defined by the non-bendable section. For example, in the first direction, a left side of the display panel is the bendable section and a right side is the non-bendable section, so that the left side of the display panel may be bent above or below the right side.

As shown in FIGS. 5 and 6, the display panel further includes the cover plate 20 disposed on a display side of the display substrate 10, and a circumferential edge of the cover plate 20 protrudes from the display area 100. A size of the display panel in the first direction X is a size of the cover plate 20 in the first direction X.

In the embodiment of the present disclosure, when the display panel is bent in the first direction X, the non-bendable section 33 will not be bent. The bending area 111 is located within the range defined by the non-bendable section 33, thus the bending area 111 will not be bent in the first direction X, so that the bending area 111 will not be subjected to a bending force along the first direction X. Moreover, since the bending area 111 is located outside the first bendable section 31 and the second bendable section 32, the bending area 111 will not be subjected to a shear stress caused by bending of the cover plate 20, thus the bending area 111 is only subjected to an internal bending force caused by its own bending (as shown in FIG. 3). Compared with that shown in FIG. 4, in the embodiment of the present disclosure forces acting on the bending area 111 are decreased greatly, which is conducive to dispersion of the forces acting on the bending area 111, and avoids cracks of the bending area 111 and ensures normal display of the display panel.

In an embodiment, a size of the bending area 111 in the first direction X is ¼ to ½ of a size of the display panel in the first direction X. In an embodiment, the size of the bending area 111 in the first direction X is ⅓ of the size of the display panel in the first direction X.

In this embodiment, as shown in FIG. 6, a range of the non-bendable section 33 in the first direction coincides with a range of the bending area 111 in the first direction X, and both are ⅓ of the size of the display panel in the first direction X.

In this embodiment, the first bendable section 31 and the second bendable section 32 are arranged on both sides of the display panel symmetrically. The non-bendable section 33 and the bending area 111 are also arranged symmetrically, as shown in FIG. 6.

In an embodiment, as shown in FIG. 5, the flexible bending portion 11 further includes a bonding area 112 located on a side of the bending area 111 away from the display area 100. In the first direction, a size of the bonding area 112 is larger than a size of the bending area 111.

In FIG. 5, the size of the bending area 111 in the first direction X is M1, and the size of the bonding area 112 in the first direction X is M2. In FIG. 2, the size of the bending area 111 in the first direction X is equal to the size of the bonding area 112 in the first direction X, both sizes are M0. In an embodiment, the bonding area 112 is provided with multiple bonding pads for bonding to connect with a control circuit board, and the bending area 111 is provided with multiple connecting lines for connecting the bonding pads to signal lines in the display area. The connecting lines may include VSS connecting lines, VDD connecting lines, data lines, or the like. In order to reduce the size of the bending area 111 in the first direction X from M0 to M1, a width of the connecting lines and a spacing between adjacent connecting lines in the bending area 111 may be reduced within a range allowable by the process, thus the size of the bending area 111 in the first direction X is reduced, so that the bending area 111 keeps away from the bendable section of the display panel in the first direction X. A size and spacing of the bonding pads are not easy to change, so M2 may be equal to M0 to implement effective bonding of the bonding area 112.

In an embodiment, the flexible bending portion 11 further includes a transition area 113 disposed between the bending area 111 and the bonding area 112. Side edges of the transition area 113 are straight edges, as shown in FIG. 5.

Figure 7:
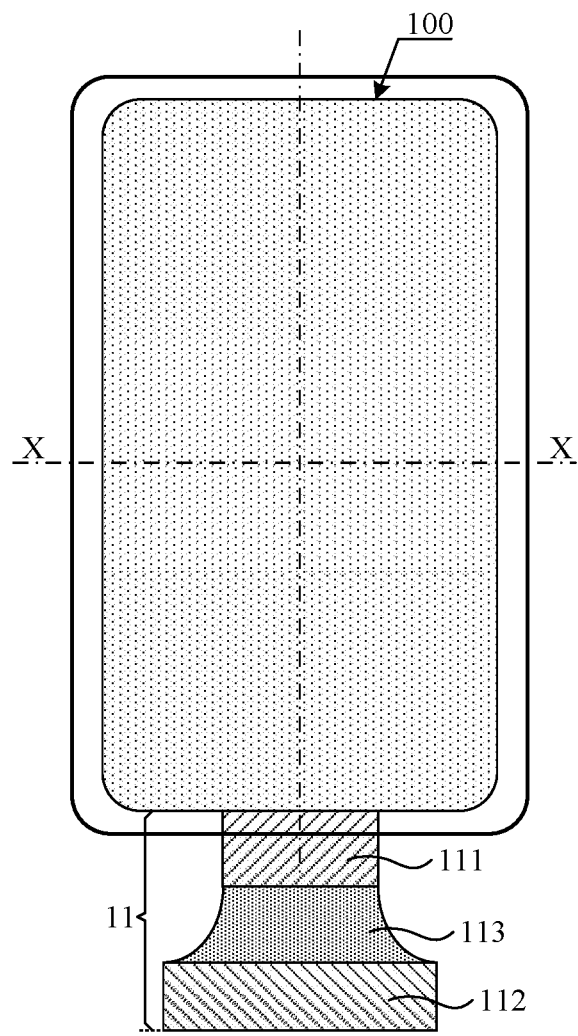
FIG. 7 is a schematic diagram of a structure of an unfolded display panel according to another embodiment.

FIG. 7 is a schematic diagram of a structure of an unfolded display panel according to another embodiment. In another embodiment, as shown in FIG. 7, a flexible bending portion 11 further includes a transition area 113 disposed between a bending area 111 and a bonding area 112. Side edges of the transition area 113 are curved edges, which may be convex curved edges, concave curved edges, or irregular curved edges or the like.

In an exemplary implementation, the flexible bending portion may not be provided with the transition area, but the bending area and the bonding area are connected directly.

In another embodiment, the display panel according to an embodiment of the present disclosure is also a bendable panel in the second direction Y, thus the display panel according to the embodiment of the present disclosure is a four-side bendable panel.

Based on the inventive concept of the exemplary embodiments described above, an embodiment of the present disclosure further provides a display device including a display panel according to the embodiments described above. The display device may be any product or component with a display function, such as a mobile phone, a tablet computer, a television, a display, a notebook computer, a digital photo frame, a navigator, etc.

In the description of the embodiments of the present disclosure, it should be understood that orientation or position relationships indicated by the terms "middle", "upper", "lower", "front", "rear", "vertical", "horizontal", "top", "bottom", "inner", "outer" and the like is based on orientation or position relationships shown in the accompanying drawings, and are only for the purpose of describing the present disclosure and simplifying the description, rather than indicating or implying that the mentioned device or element must have the specific orientation, or be constructed and operated in the specific orientation, and thus cannot be interpreted as a limitation to the present disclosure.

In the description of the embodiments of the present disclosure, it should be noted that, unless otherwise specified and defined clearly, the terms "install", "connect", "couple" should be understood in a broad sense, for example, the connection may be a fixed connection, a detachable connection, or an integral connection; it may be a mechanical connection or an electrical connection; it may be a direct connection, an indirect connection through an intermediary, or an internal connection between two elements. Those of ordinary skills in the art can understand specific meanings of the above terms in the present disclosure according to specific situations.

Although the embodiments disclosed in the present disclosure are described above, the described contents are only the embodiments for facilitating understanding of the present disclosure, and are not intended to limit the present disclosure. Any person skilled in the art to which the present disclosure pertains may make any modification and variation in forms and details of implementation without departing from the spirit and scope of the present disclosure, however, the patent protection scope of the present disclosure shall still be subject to the scope defined by the appended claims.

What we claim is:

1. A display panel, comprising a display substrate, wherein the display substrate comprises a display area and a flexible bending portion protruding from the display area, the flexible bending portion comprises a bending area close to the display area, the flexible bending portion is hidden in one side of the display substrate away from a display side after the bending area is bent, the display panel is a bendable panel in a first direction, the display panel has a bendable section and a non-bendable section in the first direction, and the bending area is located within a range defined by the non-bendable section in the first direction, and the first direction is a direction perpendicular to a direction in which the flexible bendable portion protrudes relative to the display area,
   wherein the flexible bending portion further comprises a bonding area located on one side of the bending area away from the display area, and a size of the bonding area is larger than a size of the bending area in the first direction, and the bending area is kept away from the bendable section in the first direction,
   wherein the bonding area is provided with a plurality of bonding pads for bonding to connect with a control circuit board, and the flexible bending portion further comprises a transition area located between the bending area and the bonding area, and a side edge of the transition area is a curved edge-, and the transition area is not bent and the transition area acts as a linear transition from the bending area to the bonding area.

2. The display panel according to claim 1, wherein the bendable section comprises a first bendable section and a second bendable section located respectively on both sides of the display panel in the first direction, and the non-bendable section is located between the first bendable section and the second bendable section.

3. The display panel according to claim 1, wherein a size of the bending area in the first direction is ¼ to ½ of a size of the display panel in the first direction.

4. The display panel according to claim 1, wherein a size of the non-bendable section in the first direction is equal to a size of the bending area in the first direction.

5. The display panel according to claim 1, wherein the bending area is provided with a plurality of connecting lines for connecting the bonding pads to signal lines in the display area.

6. The display panel according to claim 2, wherein the first bendable section and the second bendable section are arranged on both sides of the display panel symmetrically.

7. The display panel according to claim 1, wherein the display panel is a bendable panel in a second direction perpendicular to the first direction.

8. The display panel according to claim 1, wherein the display panel further comprises a cover plate arranged on the display side of the display substrate, a circumferential edge of the cover plate protrudes from the display area, and a size of the display panel in the first direction is a size of the cover plate in the first direction.

9. A display device comprising the display panel according to claim 1.

10. The display device according to claim 9, wherein the display device is any one or more of a mobile phone, a tablet computer, a television, a display, a notebook computer, a digital photo frame, or a navigator.

11. The display panel according to claim 2, wherein the display panel further comprises a cover plate arranged on the display side of the display substrate, a circumferential edge of the cover plate protrudes from the display area, and a size of the display panel in the first direction is a size of the cover plate in the first direction.

12. The display panel according to claim 3, wherein the display panel further comprises a cover plate arranged on the display side of the display substrate, a circumferential edge of the cover plate protrudes from the display area, and a size of the display panel in the first direction is a size of the cover plate in the first direction.

13. The display panel according to claim 4, wherein the display panel further comprises a cover plate arranged on the display side of the display substrate, a circumferential edge of the cover plate protrudes from the display area, and a size of the display panel in the first direction is a size of the cover plate in the first direction.

14. The display panel according to claim 5, wherein the display panel further comprises a cover plate arranged on the display side of the display substrate, a circumferential edge of the cover plate protrudes from the display area, and a size of the display panel in the first direction is a size of the cover plate in the first direction.

15. The display panel according to claim 6, wherein the display panel further comprises a cover plate arranged on the display side of the display substrate, a circumferential edge of the cover plate protrudes from the display area, and a size of the display panel in the first direction is a size of the cover plate in the first direction.

* * * * *